(12) United States Patent
Kim

(10) Patent No.: US 11,570,221 B2
(45) Date of Patent: Jan. 31, 2023

(54) METHOD AND SYSTEM FOR GROUP CALL USING WHISPER

(71) Applicant: LINE Plus Corporation, Seongnam-si (KR)

(72) Inventor: Na Young Kim, Seongnam-si (KR)

(73) Assignee: LINE Plus Corporation, Seongnam-si (KR)

( * ) Notice: Subject to any disclaimer, the term of this patent is extended or adjusted under 35 U.S.C. 154(b) by 0 days.

(21) Appl. No.: 17/069,526

(22) Filed: Oct. 13, 2020

(65) Prior Publication Data

US 2021/0112104 A1 Apr. 15, 2021

(30) Foreign Application Priority Data

Oct. 14, 2019 (KR) .......................... 10-2019-0126918

(51) Int. Cl.
*H04L 65/403* (2022.01)
*G06F 3/0486* (2013.01)
*G06F 3/0482* (2013.01)
*G06F 3/0488* (2022.01)
*H04L 65/1093* (2022.01)
*H04L 12/18* (2006.01)

(52) U.S. Cl.
CPC .......... *H04L 65/403* (2013.01); *G06F 3/0482* (2013.01); *G06F 3/0486* (2013.01); *G06F 3/0488* (2013.01); *H04L 12/1822* (2013.01); *H04L 65/1093* (2013.01)

(58) Field of Classification Search
None
See application file for complete search history.

(56) References Cited

U.S. PATENT DOCUMENTS

| 6,608,636 B1* | 8/2003 | Roseman ................. G09B 5/14 |
| | | 348/E7.083 |
| 2004/0006595 A1* | 1/2004 | Yeh ......................... H04L 67/36 |
| | | 709/204 |
| 2005/0245317 A1* | 11/2005 | Arthur .................. A63F 13/795 |
| | | 463/42 |
| 2007/0156811 A1* | 7/2007 | Jain ...................... H04L 12/1827 |
| | | 709/204 |
| 2007/0233802 A1* | 10/2007 | Kulkarni ............... H04W 76/45 |
| | | 709/207 |

(Continued)

FOREIGN PATENT DOCUMENTS

| KR | 10-0625665 A | 9/2006 |
| KR | 10-0640324 A | 10/2006 |
| KR | 10-2015-0066421 A | 6/2015 |

*Primary Examiner* — Kavita Stanley
*Assistant Examiner* — Phoebe X Pan
(74) *Attorney, Agent, or Firm* — Sughrue Mion, PLLC

(57) ABSTRACT

A method, apparatus, system and non-transitory computer-readable record medium for a group call using whisper are provided. The group call method includes participating in a group call session with a plurality of participants; designating at least one participant among the plurality of participants as a whisper target based on a touch gesture during the group call session; generating a whisper packet configured to control a server to transfer, only to the whisper target, at least one of video and audio that are input through an input device while the whisper group is designated; and transmitting the whisper packet to the server through the group call session.

20 Claims, 18 Drawing Sheets

(56) References Cited

U.S. PATENT DOCUMENTS

| | | | | |
|---|---|---|---|---|
| 2007/0276908 | A1* | 11/2007 | Asthana | H04M 3/567 709/204 |
| 2008/0137558 | A1* | 6/2008 | Baird | H04L 12/1831 370/260 |
| 2012/0017149 | A1* | 1/2012 | Lai | H04L 65/1069 715/716 |
| 2014/0298210 | A1* | 10/2014 | Park | G06F 3/0487 715/758 |
| 2014/0310680 | A1* | 10/2014 | Howard | G06Q 10/101 717/102 |
| 2016/0065742 | A1* | 3/2016 | Nasir | H04M 3/56 455/416 |
| 2016/0205049 | A1* | 7/2016 | Kim | H04L 51/216 455/414.1 |
| 2017/0142259 | A1* | 5/2017 | Schmitz | H04L 65/403 |
| 2017/0310717 | A1* | 10/2017 | Staples | H04L 65/1093 |
| 2017/0351476 | A1* | 12/2017 | Yoakum | G06F 3/0484 |
| 2018/0248942 | A1* | 8/2018 | Smarr | H04L 67/1044 |

* cited by examiner

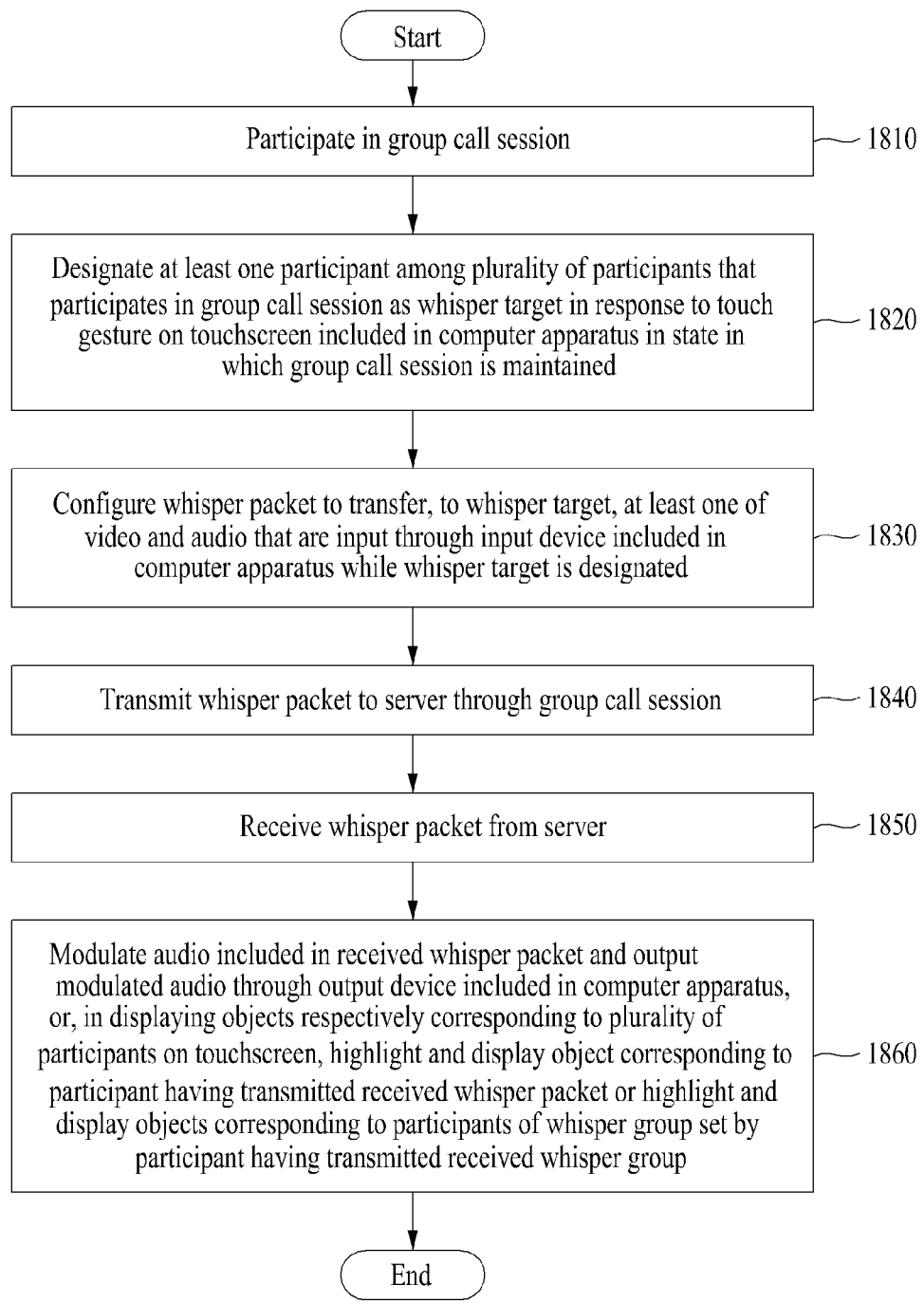

US 11,570,221 B2

METHOD AND SYSTEM FOR GROUP CALL USING WHISPER

CROSS-REFERENCE TO RELATED APPLICATION

This application claims priority to Korean Patent Application No. 10-2019-0126918, filed Oct. 14, 2019 in the Korean Intellectual Property Office, the disclosure of which is incorporated herein by reference in its entirety.

BACKGROUND

1. Field

Apparatuses, systems, and methods according to example embodiments relate to group calling.

2. Description of Related Art

A conference call refers to a group call that allows a plurality of users to talk at the same time. A group call may be implemented using a real-time call service, and may transfer audio data and media, such as video, to a call counterpart. However, in the related art data transferred through the group call is transmitted to each of the users participating in a corresponding instance of the group call. For example, in an instance of a group call participated in by five users including user 1, user 2, user 3, user 4, and user 5, data of audio/video of the user 1 is transferred to each of the remaining users, that is, the user 2, the user 3, the user 4, and the user 5. That is, in the group call according to the related art, data is broadcasted at all times.

SUMMARY

Example embodiments provide a group call method, apparatus and system in which a desired participant or participant group may be spontaneously selected during the progress of a group call to allow whispering with the selected participant or participant group.

According to an aspect of an example embodiment, there is provided a non-transitory computer-readable record medium storing instructions that, when executed by a processor of a computer apparatus including a touchscreen and an input device, cause the computer apparatus to execute a group call method including: participating in a group call session with a plurality of participants; designating at least one participant among the plurality of participants as a whisper target based on a first touch gesture on the touchscreen during the group call session; generating a whisper packet configured to control a server to transfer, only to the whisper target, at least one of video and audio that are input through the input device while the whisper target is designated; and transmitting the whisper packet to the server through the group call session.

The designating may include: displaying a plurality of objects respectively corresponding to the plurality of participants on the touchscreen; identifying an object from among the plurality of objects indicated by a touch on the touchscreen that is maintained for a preset period of time; and designating a participant corresponding to the identified object as the whisper target while the touch is maintained.

The designating may include: setting a whisper group including the at least one participant during the group call session; activating the whisper group based on a second touch gesture on the touchscreen; and designating the at least one participant included in the whisper group as the whisper target while the whisper group is active.

The setting of the whisper group may include setting at least two whisper groups, each of which includes at least one participant, and the activating of the whisper group may include selectively activating a single whisper group among the at least two whisper groups based on the second touch gesture.

The whisper group may be automatically set for each of the at least one participant included in the whisper group through the server based on the whisper group being set.

The setting of the whisper group may include: displaying a plurality of objects respectively corresponding to the plurality of participants and a whisper group setting area on the touchscreen; identifying an object from among the plurality of objects that is moved to the whisper group setting area through a drag-and-drop gesture; and including a participant from among the plurality of participants that corresponds to the identified object in the whisper group.

The setting of the whisper group may include: displaying a plurality of objects respectively corresponding to the plurality of participants and a whisper group generation button in a whisper group generation area on the touchscreen; activating a whisper group member selection mode based on selection of the whisper group generation button; identifying an object indicated by a touch on the touchscreen in a state in which the whisper group member selection mode is active; and including a participant from among the plurality of participants that corresponds to the identified object in the whisper group.

The activating may include activating the whisper group based on a swipe gesture in a first direction on the touchscreen.

The group call method may include: receiving a whisper packet from the server; modulating an audio signal indicated by the received whisper packet; and outputting the modulated audio through an output device of the computer apparatus.

The group call method may further include: displaying a plurality of objects respectively corresponding to the plurality of participants on the touchscreen; receiving a whisper packet from the server; and highlighting and displaying an object from among the plurality of objects corresponding to a participant having transmitted the received whisper packet.

According to an aspect of an example embodiment, there is provided a group call method including: participating in a group call session with a plurality of participants; designating at least one participant among the plurality of participants a whisper target based on a first touch gesture on a touchscreen during the group call session; generating a whisper packet configured to control a server to transfer, only to the whisper target, at least one of video and audio that are input through an input device while the whisper target is designated; and transmitting the whisper packet to the server through the group call session.

The designating may include: displaying a plurality of objects respectively corresponding to the plurality of participants on the touchscreen; identifying an object from among the plurality of objects indicated by a touch on the touchscreen that is maintained for a preset period of time; and designating a participant corresponding to the identified object as the whisper target while the touch is maintained.

The designating may include: setting a whisper group including the at least one participant during the group call session; activating the whisper group based on a second touch gesture; and designating the at least one participant included in the whisper group as the whisper target while the whisper group is active.

The setting of the whisper group may include setting at least two whisper groups, each of which includes at least one participant, and the activating of the whisper group may include selectively activating a single whisper group among the at least two whisper groups based on the second touch gesture.

The whisper group may be automatically set for each of the at least one participant included in the whisper group through the server based on the whisper group being set.

The setting of the whisper group may include: displaying a plurality of objects respectively corresponding to the plurality of participants and a whisper group setting area on the touchscreen; identifying an object from among the plurality of objects that is moved to the whisper group setting area through a drag-and-drop gesture; and including a participant from among the plurality of participants that corresponds to the identified object in the whisper group.

The setting of the whisper group may include: displaying a plurality of objects respectively corresponding to the plurality of participants and a whisper group generation button in a whisper group generation area on the touchscreen; activating a whisper group member selection mode based on selection of the whisper group generation button; identifying an object indicated by a touch on the touchscreen in a state in which the whisper group member selection mode is active; and including a participant from among the plurality of participants that corresponds to the identified object in the whisper group.

The activating may include activating the whisper group based on a swipe gesture in a first direction on the touchscreen.

The group call method may further include: receiving a whisper packet from the server; modulating an audio signal indicated by the received whisper packet; and outputting the modulated audio through an output device.

The group call method may further include: displaying a plurality of objects respectively corresponding to the plurality of participants on the touchscreen; receiving a whisper packet from the server; and highlighting and displaying an object from among the plurality of objects corresponding to a participant having transmitted the received whisper packet.

According to an aspect of an example embodiment, there is provided a computer apparatus including: a touchscreen; an input device; at least one memory configured to store computer-readable instructions; and at least one processor configured to execute the computer-readable instructions to: participate in a group call session with a plurality of participants, designate at least one participant among the plurality of participants as a whisper target based on a first touch gesture on the touchscreen during the group call session, generate a whisper packet configured to control a server to transfer, only to the whisper target, at least one of video and audio that are input through the input device while the whisper target is designated, and transmit the whisper packet to the server through the group call session.

The at least one processor may be further configured to execute the computer-readable instructions to: display a plurality of objects respectively corresponding to the plurality of participants on the touchscreen, identify an object from among the plurality of objects indicated by a touch on the touchscreen that is maintained for a preset period of time, and designate a participant corresponding to the identified object as the whisper target while the touch is maintained.

The at least one processor may be further configured to execute the computer-readable instructions to: set a whisper group including the at least one participant during the group call session, activate the whisper group based on a second touch gesture on the touchscreen, and designate the at least one participant included in the whisper group as the whisper target while the whisper group is active.

The computer apparatus may further include an output device, and the at least one processor is further configured to execute the computer-readable instructions to: display a plurality of objects respectively corresponding to the plurality of participants on the touchscreen, receive a whisper packet from the server, modulate an audio signal indicated by the received whisper packet, output the modulated audio through the output device included in the computer apparatus, and highlight an object from among the plurality of objects corresponding to a participant having transmitted the received whisper packet.

BRIEF DESCRIPTION OF THE FIGURES

The above and/or other aspects will be more apparent by describing certain example embodiments, with reference to the accompanying drawings, in which:

FIG. 18 is a flowchart illustrating an example of a group call method according to at least one example embodiment.

DETAILED DESCRIPTION

Figure 1:
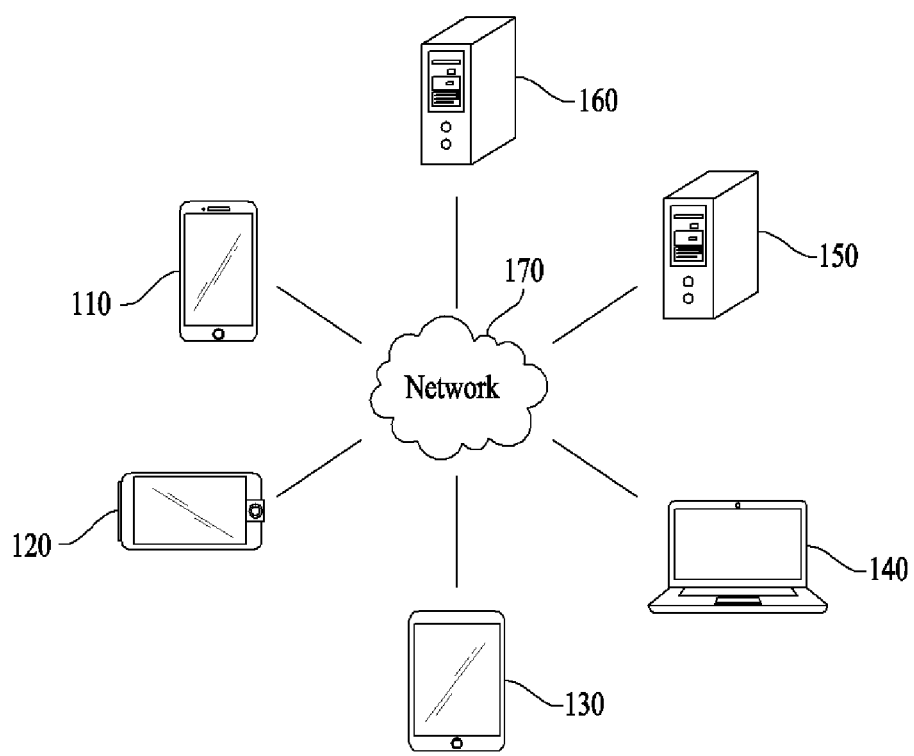
FIG. 1 is a diagram illustrating an example of a network environment according to at least one example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer record medium or device, capable of providing instructions or data to, or being interpreted by, a hardware device. The software also may be distributed over network coupled computer systems so that the software is stored and executed in a distributed fashion. In particular, for example, software and data may be stored by one or more computer readable record mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable record medium into the one or more storage devices and/or one or more computer processing devices using a drive mechanism. Such separate computer readable record medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable record medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments are described with reference to the accompanying drawings.

A group call system according to example embodiments may be implemented by at least one computer system, a group call apparatus according to example embodiments may be implemented by at least one computer apparatus included in the group call system, and a group call method according to example embodiments may be performed through at least one computer apparatus included in the group call system. Here, a computer program according to example embodiments may be installed and executed on the computer apparatus, and the computer apparatus may perform the group call method under control of the executed computer program. The computer program may be stored in a computer-readable storage medium to execute the group call method on a computer in conjunction with the computer apparatus.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto. Also, the network environment of FIG. 1 is provided to describe one example among environments applicable to the example embodiments. An environment applicable to the example embodiments is not limited to the network environment of FIG. 1.

Each of the plurality of electronic devices 110, 120, 130, and 140 may be a stationary terminal or a mobile terminal that is configured as a computer apparatus. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, and the like. For example, although FIG. 1 illustrates a shape of a smartphone as an example of the electronic device 110, the electronic device 110 used herein may refer to one of various types of physical computer apparatuses capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, and a broadcasting network) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and 140 over the network 170. For example, the server 150 may be a system that provides a service (e.g., a group call service or an audio conferencing service, a messaging service, a mail service, a social network service, a map service, a translation service, a financial service, a payment service, a search service, and a content providing service) to the plurality of electronic devices 110, 120, 130, and 140 connected over the network 170.

Figure 2:
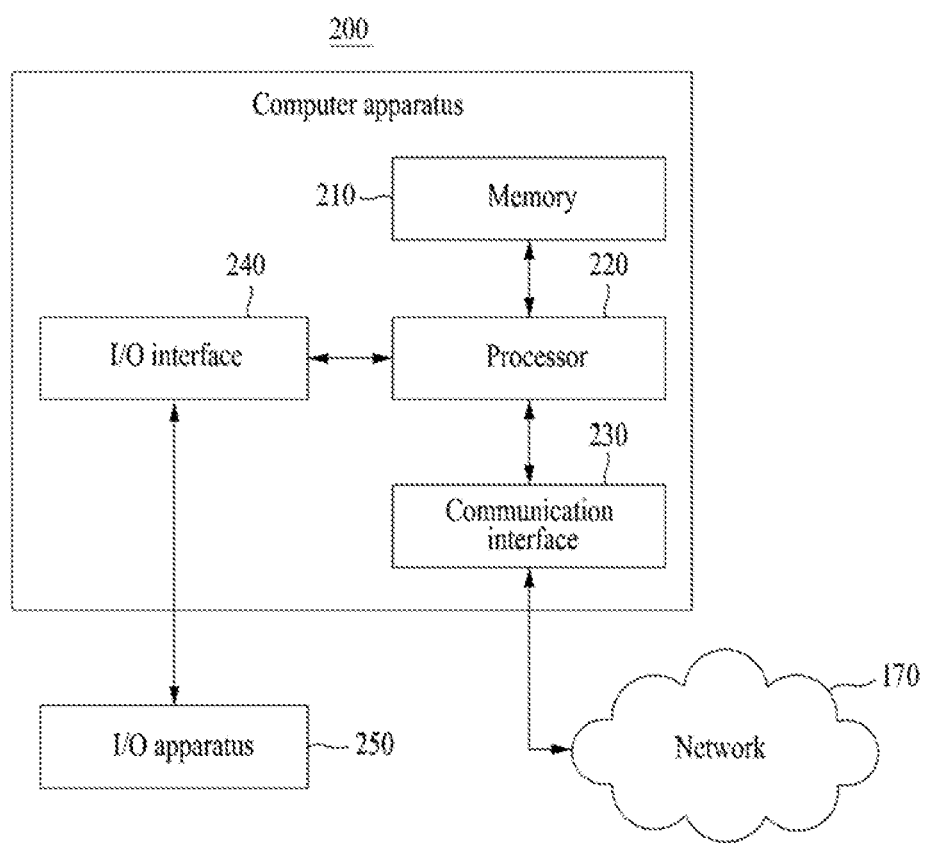
FIG. 2 is a diagram illustrating an example of a computer apparatus according to at least one example embodiment.

FIG. 2 is a block diagram illustrating an example of a computer apparatus according to at least one example embodiment. A computer apparatus 200 shown in FIG. 2 may correspond to any one of the plurality of electronic devices 110, 120, 130, and 140 or any one of the plurality of servers 150 and 160.

Referring to FIG. 2, the computer apparatus 200 may include a memory 210, a processor 220, a communication interface 230, and an input/output (I/O) interface 240. The memory 210 may include a permanent mass storage device, such as random access (RAM), read only memory (ROM), and a disc drive, as a non-transitory computer-readable storage medium. Here, the permanent mass storage device, such as ROM and disc drive, may be included in the computer apparatus 200 as a separate permanent storage device different from the memory 210. Also, an operating system (OS) and at least one program code may be stored in the memory 210. Such software components may be loaded from another non-transitory computer-readable storage medium to the memory 210. The other non-transitory computer-readable storage medium may include a non-transitory computer-readable storage medium, for example, a floppy drive, a disk, a tape, a DVD/CD-ROM drive, a memory card, etc. According to other example embodiments, software components may be loaded to the memory 210 through the communication interface 230, instead of, or in addition to, the non-transitory computer-readable storage medium. For example, the software components may be loaded to the memory 210 of the computer apparatus 200 based on a computer program installed by files received over the network 170.

The processor 220 may be configured to process computer-readable instructions of a computer program by performing basic arithmetic operations, logic operations, and I/O operations. The computer-readable instructions may be provided from the memory 210 or the communication interface 230 to the processor 220. For example, the processor 220 may be configured to execute received instructions in response to a program code stored in a storage device, such as the memory 210.

The communication interface 230 may include a transceiver (transmitter and receiver), and may provide a function for communication between the computer apparatus 200 and another apparatus, for example, the aforementioned electronic devices 120, 130, and 140, and/or the servers 150 and 160, over the network 170. For example, the processor 220 of the computer apparatus 200 may transfer data, a file, a request or an instruction created based on the program code stored in the storage device, such as the memory 210, etc., to other apparatuses over the network 170 under control of the communication interface 230. The communication interface 230 may receive a signal, an instruction, data, a file, etc., from another apparatus. For example, a signal, an instruction, data, etc., received through the communication interface 230 may be transferred to the processor 220 or the memory 210, and a file, etc., may be stored in a storage medium, for example, the permanent storage device, further includable in the computer apparatus 200.

The I/O interface 240 may be a device used to interface with an I/O apparatus 250. For example, an input device may include a device, such as a microphone, a keyboard, and a mouse, and an output device may include a device, such as a display device and a speaker. As another example, the I/O interface 240 may be a device for interface with an apparatus in which an input function and an output function are integrated into a single function, such as a touchscreen. The I/O apparatus 250 may be configured as a single apparatus with the computer apparatus 200. For example, a touchscreen, a microphone, a speaker, etc., may be included in the computer apparatus 200, such as a smartphone.

According to other example embodiments, the computer apparatus 200 may include a number of components greater than or less than a number of components shown in FIG. 2. For example, the computer apparatus 200 may include at least a portion of the I/O apparatus 250, or may further include other components, for example, a transceiver, a database (DB), and the like.

Figure 3:
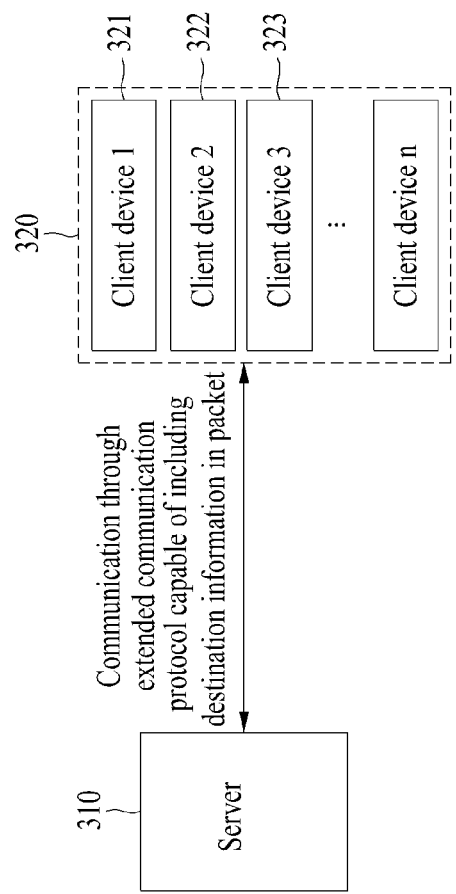
FIG. 3 illustrates an example of a group call system according to at least one example embodiment.

FIG. 3 illustrates an example of a group call system according to at least one example embodiment. The group call system may include a server 310 configured to provide a group call service and client devices 320 for a plurality of participants. In contrast to the related art, communication between the server 310 and the client devices 320 may be performed through an extended transfer protocol in which destination information is included in a packet according to example embodiments. For example, a case in which a client device 1 321, a client device 2 322, and a client device 3 323 among the client devices 320 participate in a single group call instance may be considered. In this case, each of the client device 1 321, the client device 2 322, and the client device 3 323 that participate in the corresponding group call instance may designate a specific participant and may transmit a packet to a client device corresponding to the specific participant. For example, the client device 1 321 may designate the participant corresponding the client device 3 323 and may transfer media, such as audio or video, to only the client device 3 323. In this regard, the client device 3 323 may be a whisper target and the client device 1 may whisper to the client device 3 323.

That is, according to the example embodiment, a participant of a group call service may transmit data to all of participants of a corresponding group call instance and may also transmit data to a specific participant or a small group of specific participants (i.e., a whisper target). For example, the client device 1 321 may transmit data to the client device 2 322 but not transmit data to the client device 3 323. For example, the client device 321 1 may transmit data to the client device 2 322 and the client device 3 323, but not transmit data to the client device n.

FIGS. 4 to 7 illustrate examples of a group call process according to at least one example embodiment.

Figure 4:
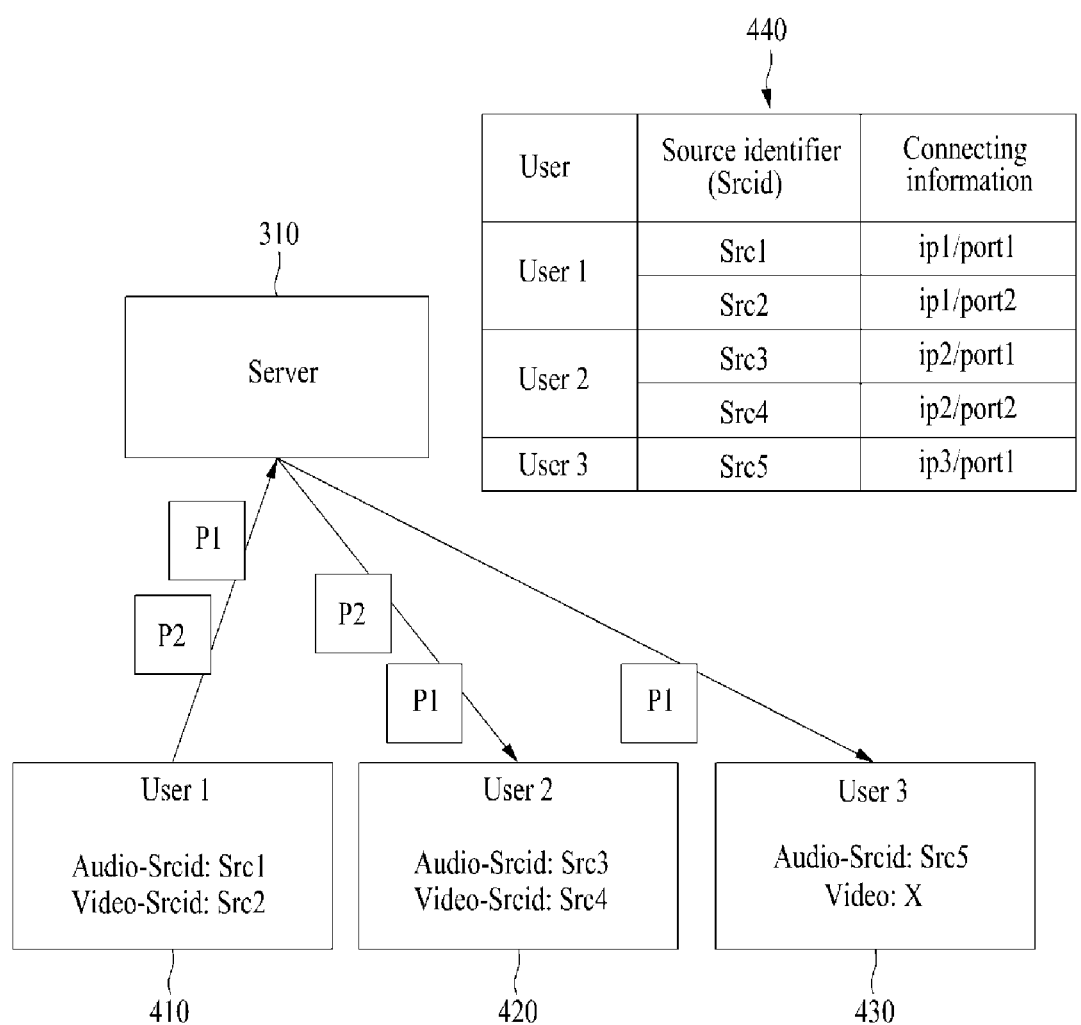
FIGS. 4 to 7 illustrate examples of a group call process according to at least one example embodiment.

FIG. 4 illustrates an example in which User 1 410, User 2 420, and User 3 430 participate in a group call instance. Here, each of the User 1 410, the User 2 420, and the User 3 430 may correspond to one of the client devices 320 of FIG. 3. Here, the server 310 may manage a table that includes a source identifier (Srcid) and connecting information for each of the User 1 410, the User 2 420, and the User 3 430 as shown in a table 440. The source identifier (Srcid) refers to a unique value for each group call and, generally, may be used to identify a source of data received at the server 310 from the users (e.g., an audio source of a user A or a video source of a user B). In addition, according to some example embodiments, the source identifier may be used to identify a destination of which user data transmitted from one of the client devices 320 to the server 310 is to be transferred to in association with connecting information, that is, to identify destination information of the data. For example, the source identifier (Srcid) and the connecting information may be managed as a single table with other information about the User 1 410, the User 2 420, and the User 3 430. In response to receiving, from a client device of each user, a request for initiating or participating in a group call with call related information, such as a type of media to be transmitted or received, the server 310 may manage a table, such as the table 440, by allocating at least one source identifier based on call related information received from the client device. The server 310 may transmit, to the client device initiating or participating in the group call, the source identifier allocated to the corresponding client device. Also, if other users are participating in the group call, the server 310 may transmit source identifiers of at least a portion of the other users participating in the group call to the client device of the user participating in the group call. Also, the server 310 may transmit source identifiers of at least a portion of other users participating in the group call to the client device of the user participating in the group call in response to a request from the client device or based on determination of the server 310, during the group call. For example, the User 1 410 may use client device 1 321, the User 2 420 may use client device 2 322 and the User 3 430 may use client device 3 323. The client device 1 321 and the client device 2 322 may each include an audio device and a video device. The client device 3 323 may include an audio device but not a video device. The User 3 430, using client device 3 323 that does not include a video device, may join a group call which uses audio and video between the User 1 410, using client device 1 321, and the User 2 420, using client device 2. In response to the server 310 receiving a request from the User 3 430 for participating in the group call with call related information of the User 3 430, the server 310 may allocate a source identifier Src5 to the User 3 430 and may store the source identifier Src5 in the table 440 in association with connecting information ip3/port1 corresponding to the source identifier Src5. Here, the server 310 may transmit, to the client device 3 323 of the User 3 430, source identifier information of the User 1 410 and the User 2 420 already participating in the group call with the source identifier Src5 allocated to the User 3 430. For example, the server 310 may transmit, to the client device 3 323 of the User 3 430, source identifier information Src1 for audio of the User 1 410 and source identifier information Src3 for audio of the User 2 420. For example, the server 310 may not transmit, to the client device 3 323 of the User 3 430, source identifier information Src2 for video of the User 1 410 and source identifier information Src4 for video of the User 2 420. Also, the server 310 may notify the User 1 410 and the User 2 420 already participating in the group call that the source identifier of the User 3 430 is Src5.

Here, referring to FIG. 4, it is assumed that, when the User 1 410, the User 2 420, and the User 3 430 are participating in the group call, the User 1 410 transmits a packet P1 and a packet P2 to the server 310 without designating at least a portion of users. Here, each of the packets P1 and P2 may include a source identifier. For example, when the packet P1 includes audio data and the packet P2 includes video data, the packet P1 may include a source identifier Src1 of the User 1 410 for audio and the packet P2 may include a source identifier Src2 of the User 1 410 for video. In this case, the server 310 may identify that the packet P1 includes audio data based on the source identifier Src1 included in the packet P1, and may transfer the packet P1 to user devices of the User 2 420 and the User 3 430 having audio sources through ip2/port1 and ip3/port1 by referring to the table 440. Also, the server 310 may identify that the packet P2 includes video data based on the source identifier Src2 included in the packet P2, and may transfer the packet P2 to the user device of the User 2 420 having the video source through ip2/port2 by referring to the table 440. Here, because a video source is not allocated to the User 3 430, the packet P2 is not transferred to the User 3 430.

Figure 5:
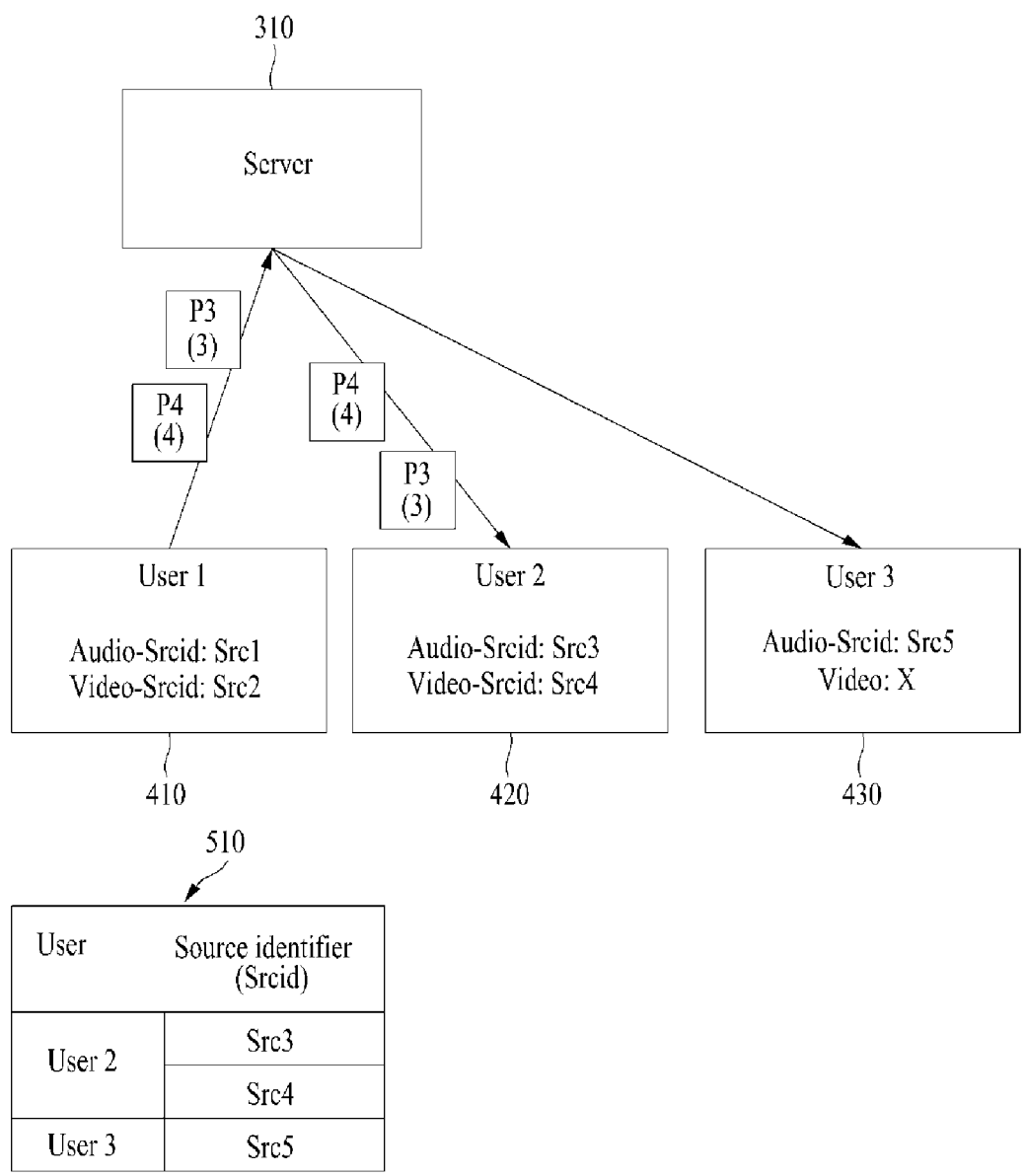

FIG. 5 illustrates an example of a process in which the User 1 410 transfers audio and video of the User 1 410 only to the User 2 420 during a group call. In response to receiving a request from the User 1 410 for transferring audio and video only to the User 2 420 during the group call, the server 310 may identify destination information in a packet transmitted from the User 1 410 and transfer the packet only to the User 2 420 based on the destination information in the packet. For example, the User 1 410 may designate User 2 420 as a whisper target and whisper to the User 2 420 by transferring audio and video only to the User 2 420. The example illustrated in FIG. 5 differs from an example in which a destination is not specified. During the group call, a request for transferring audio and video only to the User 2 420 may be received from the User 1 410. In response thereto, a source identifier Src3 may be designated as destination information in a packet P3 that includes the audio of the User 1 410 and a source identifier Src4 may be designated as destination information in a packet P4 that includes the video of the User 1 410. For example, the server 310 may designate the destination information in response to the request. For example, the client device 321 may designate the destination information in response to the request based on source identifiers of other users received from the server 310, for example, by referring to a table 510 of FIG. 5. In this case, the server 310 may transfer the packet P3 to ip2/port1 of the User 2 420 corresponding to the source identifier Src3 designated in the packet P3 and may transfer the packet P4 to ip2/port2 of the User 2 420 corresponding to the source identifier Src4 designated in the packet P4, by referring to the table 440 of FIG. 4. Such a source identifier may be designated in each packet received from the User 1 410 until the request for transferring audio and video of the User 1 410 only to the User 2 420 during the group call is released from the User 1 410. For example, the source identifier may be designated in each packet while the User 2 420 is designated as the whisper target.

Figure 6:
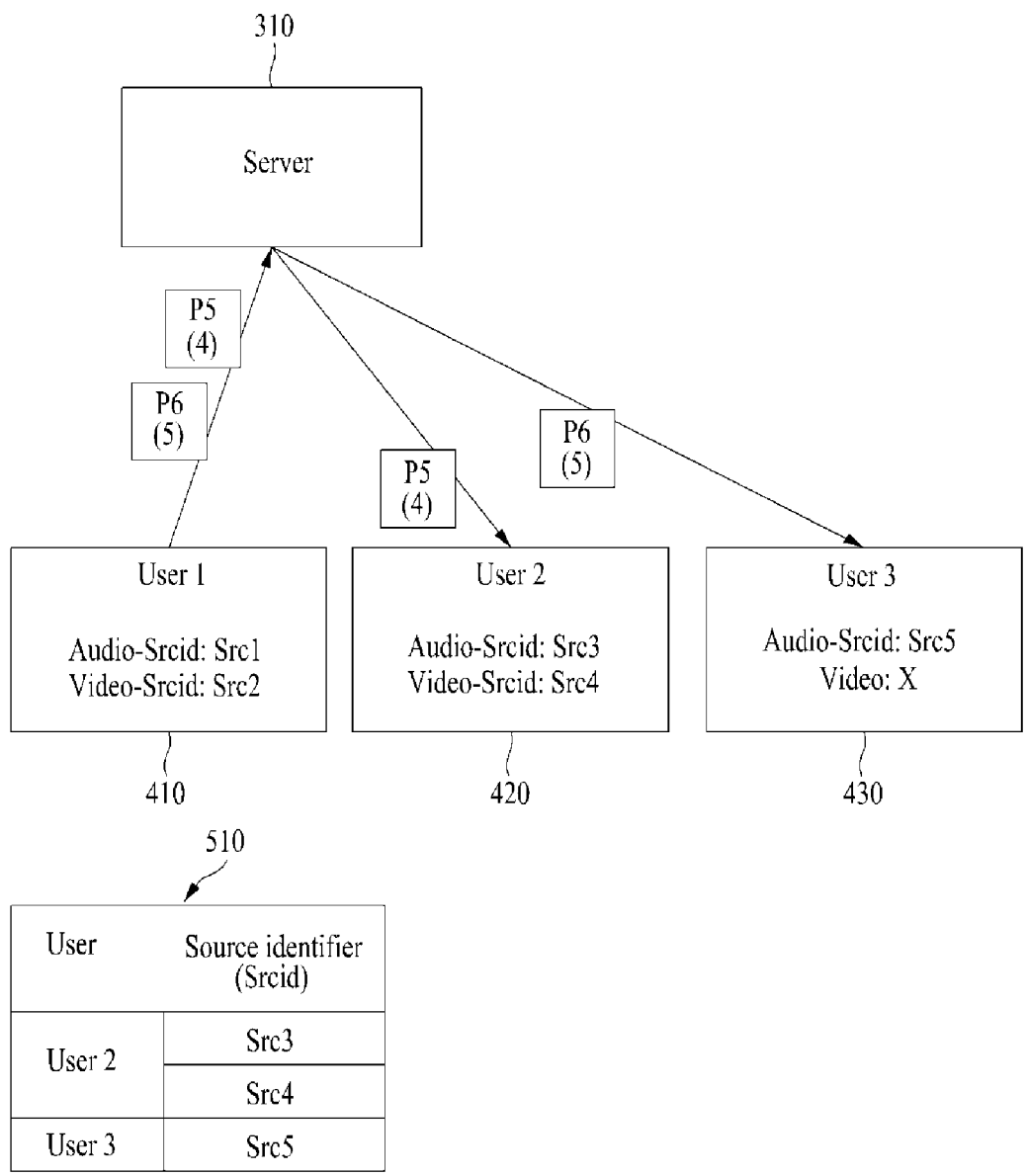

FIG. 6 illustrates an example of a process in which the User 1 410 transfers only video of the User 1 410 to the User 2 420 and transfers only audio of the User 1 410 to the User 3 430 during a group call. In response to receiving a request from the User 1 410 for transferring video of the User 1 410 only to the User 2 420 and audio of the User 1 410 only to the User 3 430, the server 310 may identify destination information in a packet transmitted from the User 1 410 and transfer the packet, based on the destination information in the packet, only to the User 2 420 if the packet is a video packet and transfer the packet only to the User 3 430 if the packet is an audio packet. The example illustrated in FIG. 6 differs from an example in which a destination is not specified. During the group call, the request for transferring video of the User 1 410 only to the User 2 420 and audio of the User 1 410 only to the User 3 430 may be received from the User 1 410. In response thereto, a source identifier Src4 may be designated as destination information in a packet P5 for the video of the User 1 410 and a source identifier Src5 may be designated as destination information in a packet P6 for the audio of the User 1 410. For example, the server 310 may designate the destination information in response to the request. For example, the client device 321 may designate the destination information in response to the request based on source identifiers of other users received from the server 310, for example, by referring to a table 510 of FIG. 6. In this case, the server 310 may transfer the packet P5 to ip2/port2 of the User 2 420 corresponding to the source identifier Src4 designated in the packet P5 and may transfer the packet P6 to ip3/port1 of the User 3 430 corresponding to the source identifier Src5 designated in the packet P6, by referring to the table 440 of FIG. 4.

As described above, a related transfer protocol may be extended to include designate destination information. Such related transfer protocols transfer a packet to all of participants in a form of broadcast and thus, do not need to designate a destination. Accordingly, there is no field for including destination information. The example embodiment may extend the related transfer protocol by adding a field for designating destination information using a reserved area in a header of a packet according to the related transfer protocol.

Figure 7:
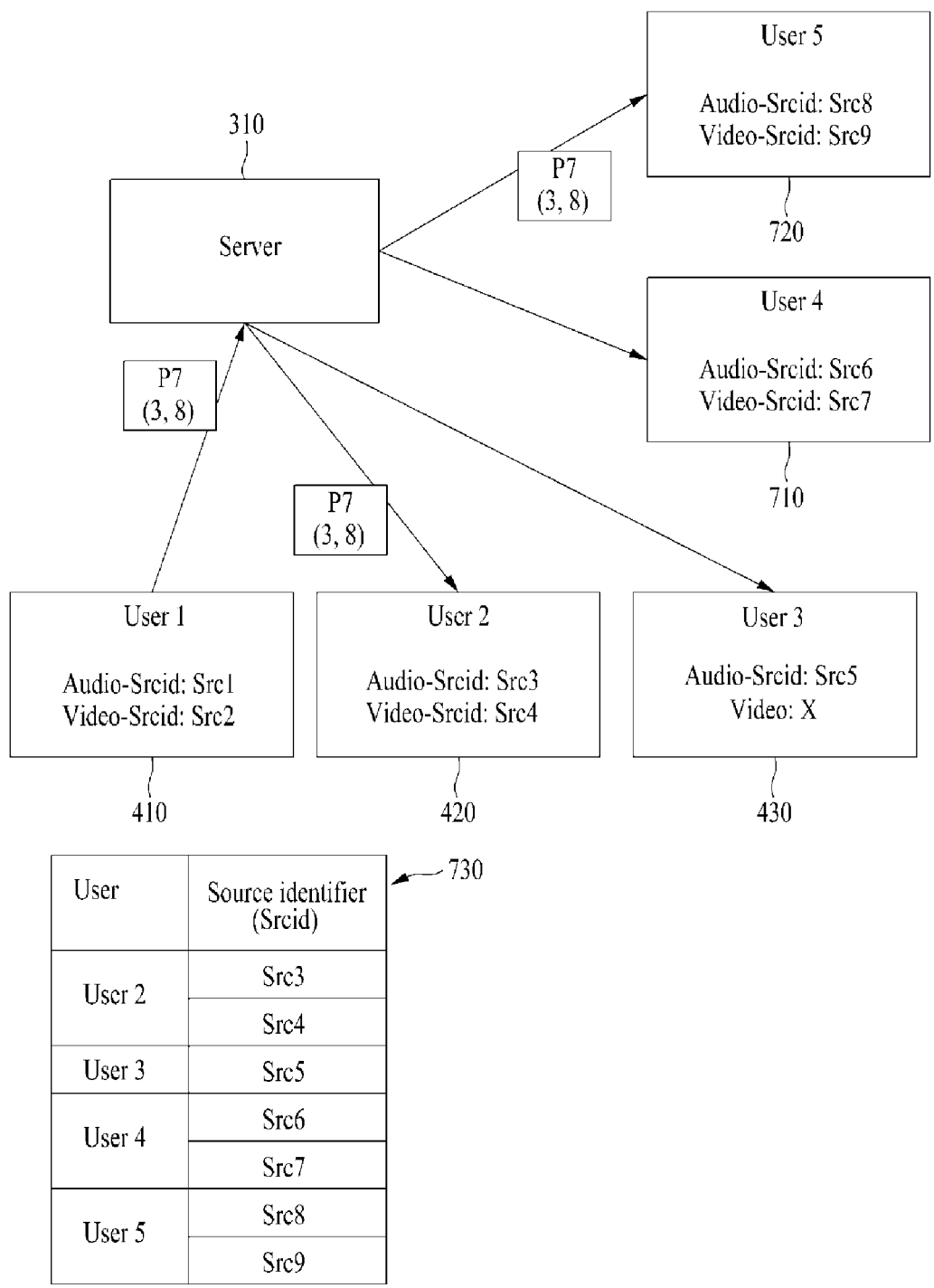

Also, at least two users may be designated for a single packet. FIG. 7 illustrates a case in which a User 4 710 and a User 5 720 as well as the User 1 410, the User 2 420, and the User 3 430 further participate in a group call instance is considered. For example, each of the User 4 710 and the User 5 720 may use one of the client devices 320 of FIG. 3. FIG. 7 illustrates an example in which the User 1 410 designates the User 2 420 and the User 5 720 and transfers audio data. In response to receiving a request from the User 1 410 for transferring audio only to the User 2 420 and the User 5 720, the server 310 may identify destination information in a packet transmitted from the User 1 410 and may transfer the packet only to the User 2 420 and the User 5 720 based on the destination information in the packet. The example illustrated in FIG. 7 differs from an example in which a destination is not specified. During the group call, a request for transferring audio only to the User 2 420 and the User 5 720 may be received from the User 1 410. In response thereto, source identifiers Src3 and Src8 may be designated as destination information in a packet P7 that includes audio of the User 1 410. For example, the server 310 may designate the destination information in response to the request. For example, the client device 321 may designate the destination information in response to the request based on source identifiers of other users received from the server 310, for example, by referring to a table 730 of FIG. 7. In this case, the server 310 may transfer the packet P7 to each of the User 2 420 and the User 5 720 through connecting information of the User 2 420 corresponding to the source identifier Src3 and connecting information of the User 5 720 corresponding to the source identifier Src8, which are designated in the packet P7.

Figure 8:
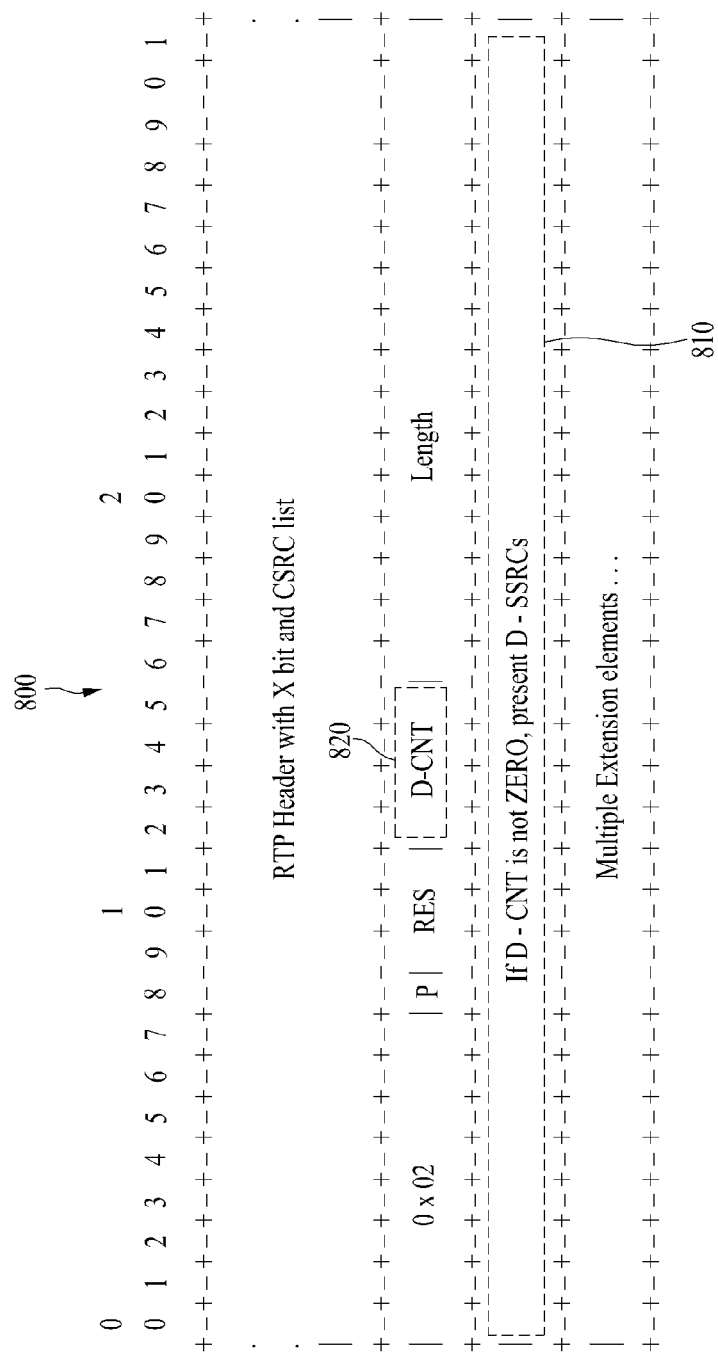
FIG. 8 illustrates an example of an extended container format based on an extended transfer protocol according to at least one example embodiment.

FIG. 8 illustrates an example of an extended container format based on an extended transfer protocol according to at least one example embodiment. FIG. 8 illustrates a container format 800 of an extended transfer protocol of a real-time transport protocol (RTP). Here, destination synchronization sources (dSSRCs) may be newly defined to manage destinations to correspond to synchronization sources (SSRCs) for managing sources in the extended transfer protocol of the RTP. Here, a first box 810 indicated with dotted lines may represent a field for recording dSSRCs (D-SSRCs) in an RTP packet header. Here, recording a dSSRC may represent recording an identifier of the dSSRC. Also, D-CNT for counting a number of dSSRCs to correspond to CC for counting a number of SSRCs may be newly defined. In FIG. 8, a second box 820 indicated with dotted lines may represent a field for counting a number of dSSRCs. In this case, a client may designate another client to which a packet is to be transferred by adding a dSSRC to the packet, and the server 310 may verify a destination to which the packet is to be transferred through the dSSRC included in the packet received from the client and may transmit the packet to the verified destination.

Figure 9:
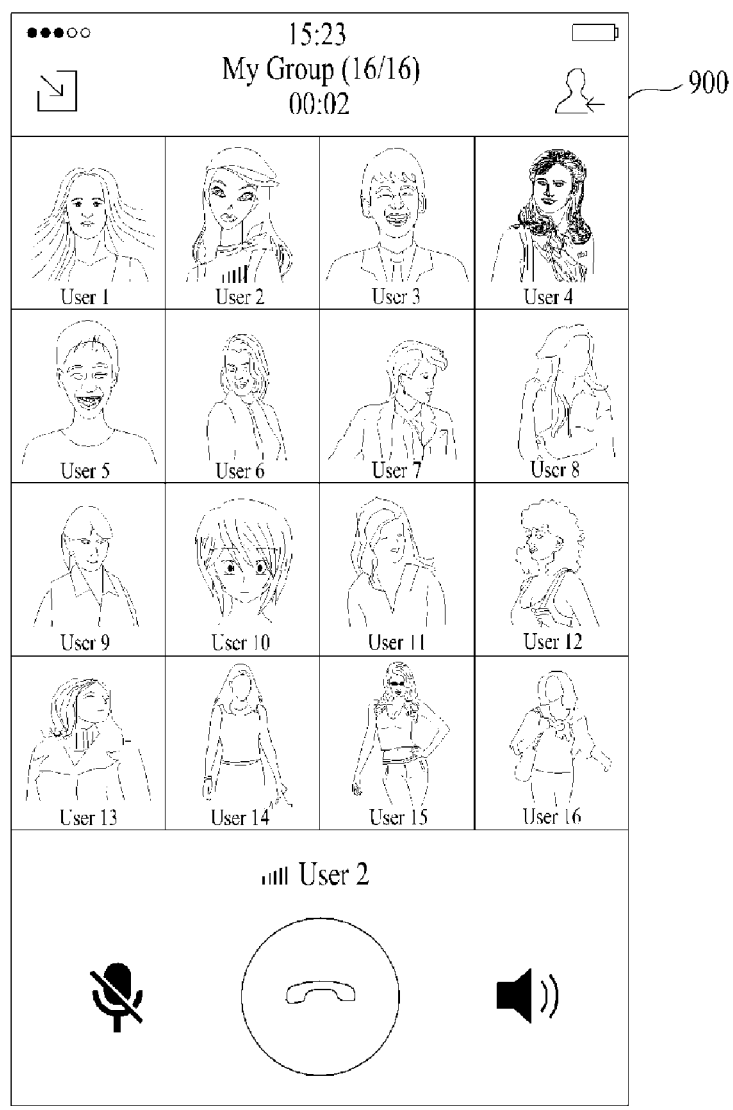
FIGS. 9 and 10 illustrate examples of a screen for selecting a whisper target according to at least one example embodiment.
Figure 10:
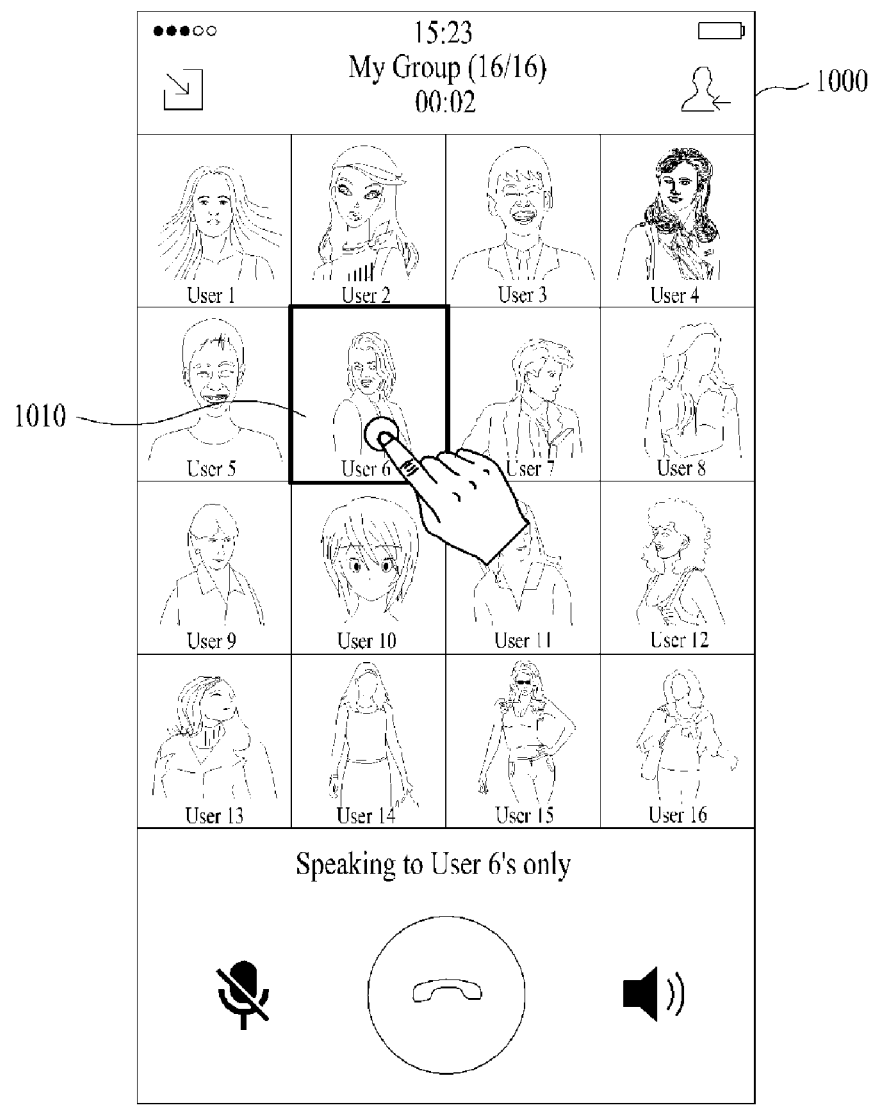

FIGS. 9 and 10 illustrate examples of a screen for selecting a whisper target according to at least one example embodiment.

Referring to FIG. 9, a first screen 900 may be a terminal screen of a user that participates in a group call. For example, terminal screen may be displayed on a terminal, which may be one of the client devices 320 of FIG. 3. The terminal screen of the user may be configured through a touchscreen. Here, videos included in packets received from a plurality of participants of a group call may be displayed on the first screen 900 through objects for the respective corresponding participants. The packets may be routed through a server for the group call and transferred to each of the participants. Also, audio, for example, voices of the respective participants, included in the packets may be output through an output device, for example, a speaker included in a terminal of a user. Also, video and/or audio input from the terminal of the user through an input device, for example, a camera and/or a microphone may be routed and may be transferred to each of the participants.

Referring to FIG. 10, a second screen 1000 represents an example in which a user selects a participant that a user desires to whisper with during a group call. For example, the user may indicate a participant that the user desires to whisper with by touching an area of an object corresponding to the participant among objects (objects that represent videos of the participants) displayed on a terminal screen of the user. Here, a terminal of the user may identify an object on which the touch is being maintained and may configure a whisper packet such that video and/or audio that are input while the touch is maintained may be transferred only to a participant corresponding to the identified object. For example, the second screen 1000 represents an example in which the user inputs a long tap gesture on an area 1010 of an object on which a video of User 6 is displayed. In this case, the terminal of the user may configure a whisper packet such that video and/or audio input during the long tap gesture may be transferred only to User 6 and may transfer the whisper packet to a server for the group call. In this case, the server may transfer the whisper packet only to the User 6 while the long tap gesture is maintained. Here, if the long tap gesture is released, the input video and/or audio may be transferred to all of the participants of the group call as displayed on the first screen 900. That is, the user may quickly and conveniently transmit a whisper to a corresponding participant by simply touching, on a screen, an object corresponding to the participant that the user desires to whisper with during the progress of the group call and may quickly return to the group call by simply releasing the touch.

Figure 11:
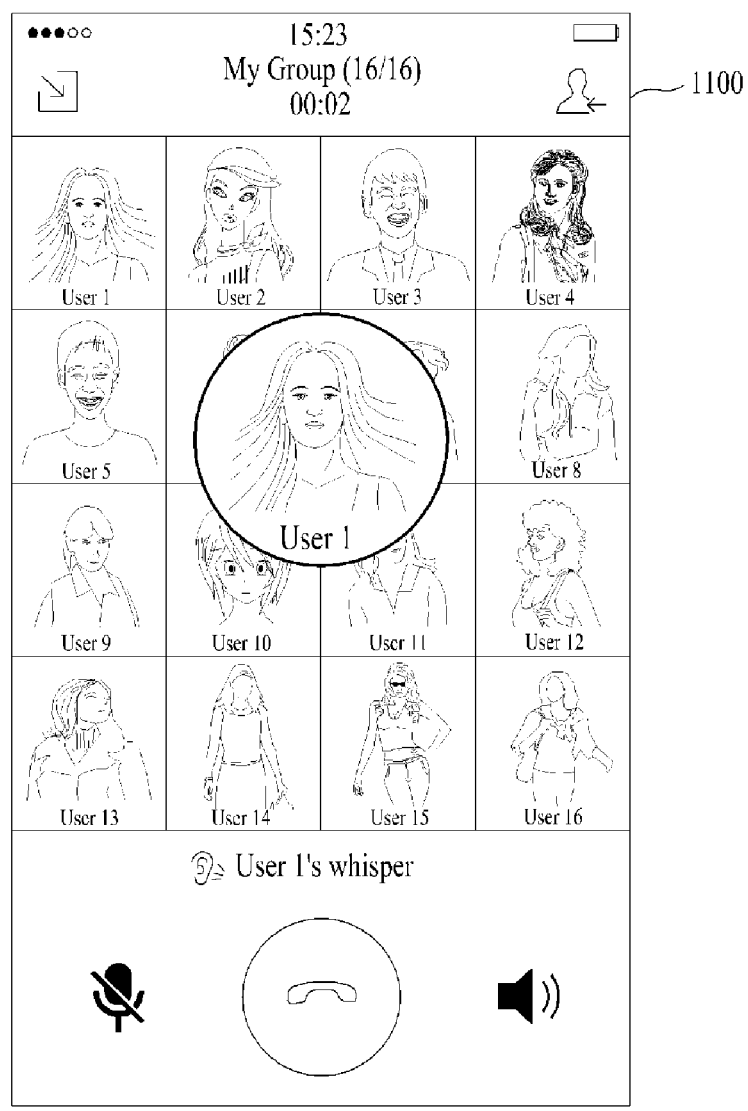
FIG. 11 illustrates an example of a screen in the case of receiving a whisper packet according to at least one example embodiment.

FIG. 11 illustrates an example of a screen of a terminal that is receiving a whisper packet according to at least one example embodiment. A third screen 1100 represents an example in which another participant transmits a whisper. Referring to the third screen 1100, in response to a whisper received from User 1, a video of the User 1 is graphically distinguished (i.e., highlighted and/or enlarged) and thereby displayed. Here, the terminal of the user may highlight and output a voice of the user 1 by modulating and outputting the whisper of the User 1, that is, an audio included in a whisper packet. For example, an audio corresponding to the whisper may be modulated through howling processing and thereby output. In this case, the user may easily identify a participant that transmits the whisper (i.e., a source of the whisper) to the user.

Figure 12:
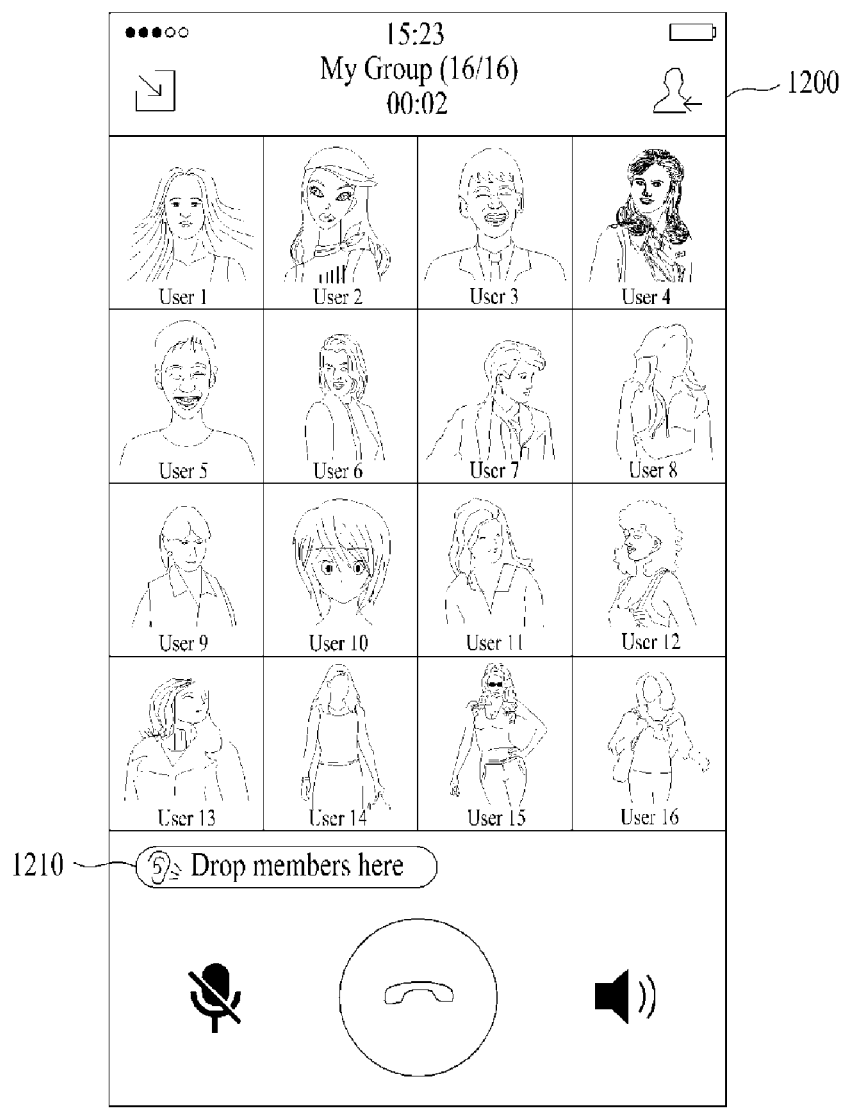
FIGS. 12 and 13 illustrate examples of setting a whisper group according to at least one example embodiment.
Figure 13:
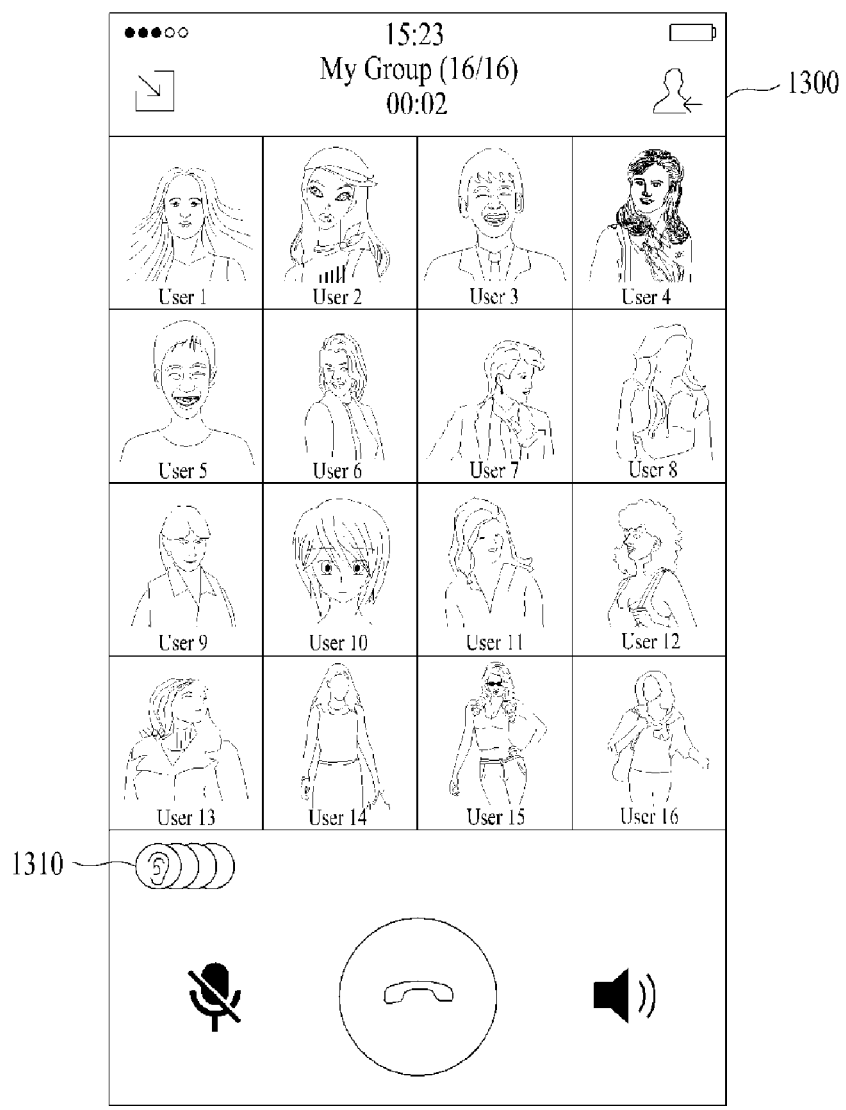

FIGS. 12 and 13 illustrate examples of setting a whisper group according to at least one example embodiment.

Referring to FIG. 12, an area 1210, indicated with "Drop members here," for setting a whisper group is displayed on a fourth screen 1200. A user may conveniently add a corresponding participant to a whisper group by moving, to the area 1210 through a drag-and-drop (D&D) gesture, an object corresponding to the participant that the user desires to include in the whisper group among objects on which videos of the participants are displayed on the fourth screen 1200.

For example, multiple participants may be added to the whisper group based on multiple drag-and-drop gestures corresponding to multiple participants. Referring to FIG. 13, a first indication 1310 on a fifth screen 1300 represents that a single participant is included in a whisper group capable of including four participants. For example, the single participant may be added to the whisper group in response to the user moving an object corresponding to the single participant to the area 1210 on the fourth screen 1200. In the same manner, the user may set the whisper group by moving, to the area 1210, objects corresponding to participants that the user desires to include in the whisper group. A number of participants includable in the whisper group may be readily set depending on example embodiments, without being particularly limited.

Figure 14:
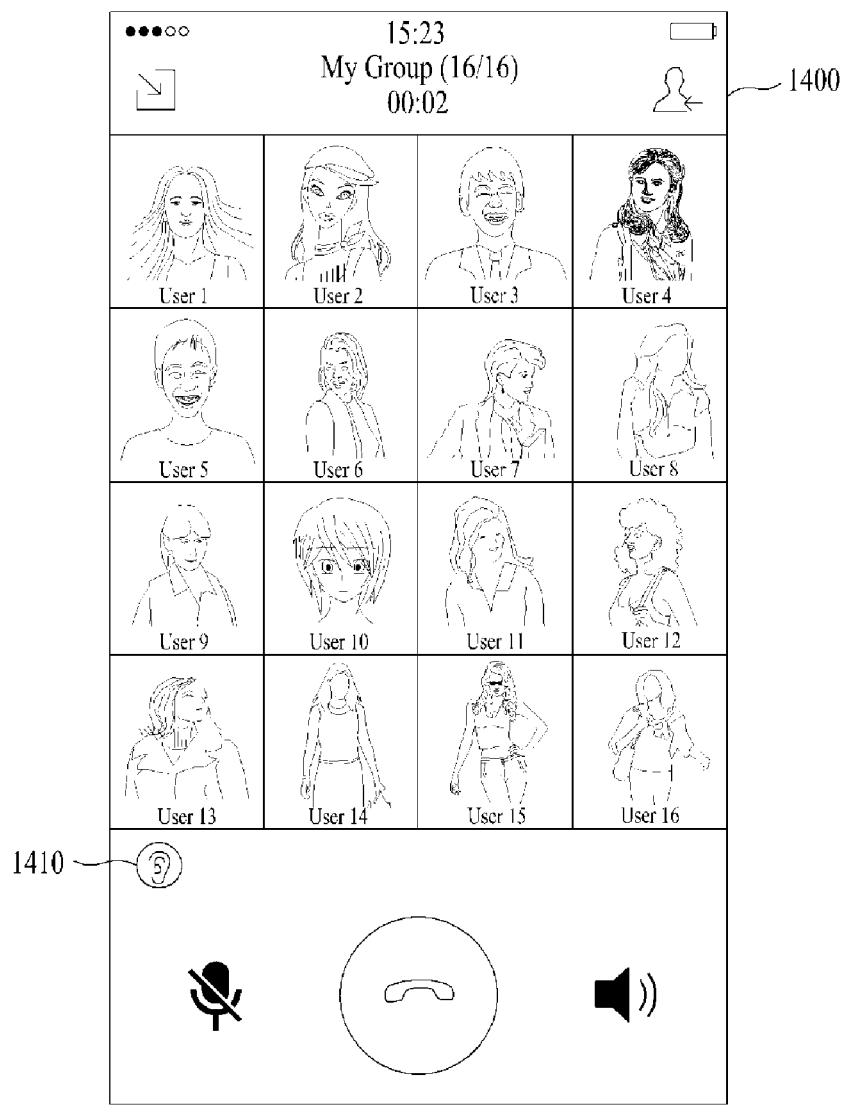
FIGS. 14 and 15 illustrate other examples of setting a whisper group according to at least one example embodiment.
Figure 15:
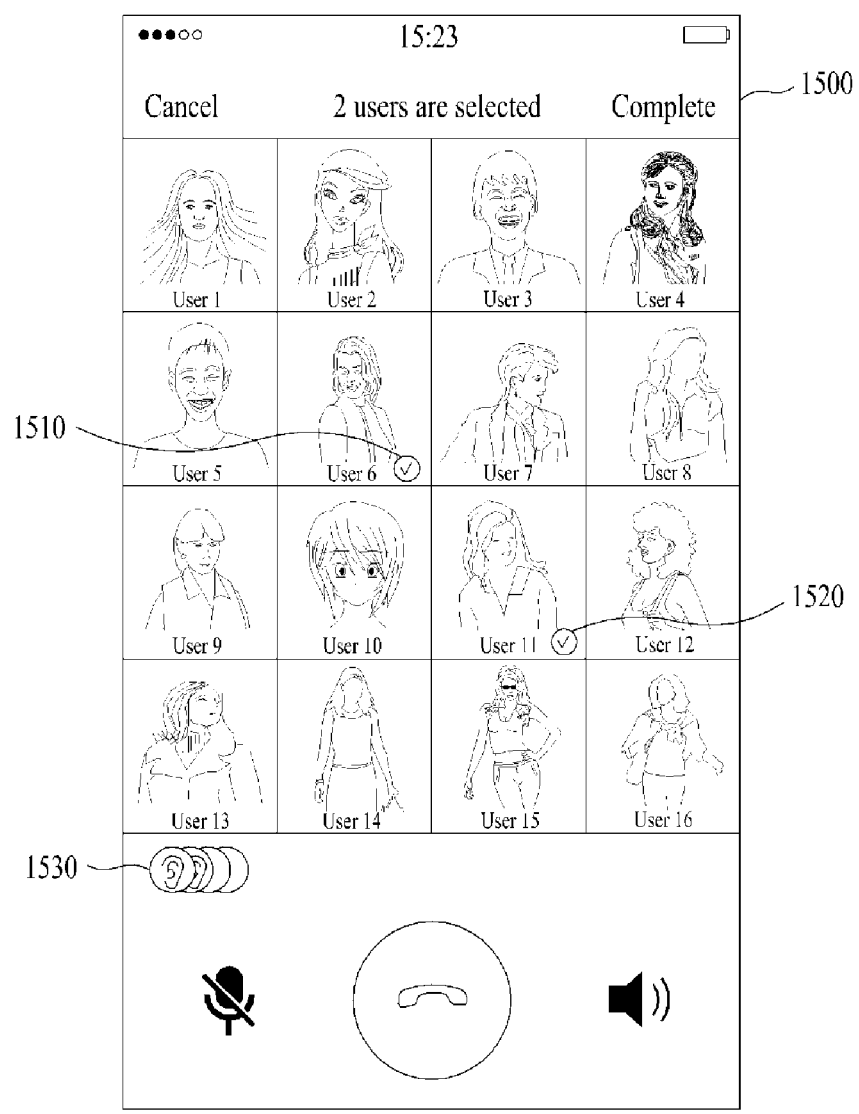

FIGS. 14 and 15 illustrate other examples of setting a whisper group according to at least one example embodiment.

Referring to FIG. 14, a button 1410 for entering a mode for selecting participants to be included in a whisper group is displayed on a sixth screen 1400. In response to the user selecting the button 1410, for example, touching an area on which the button 1410 is displayed with a finger, the corresponding mode may be activated. Also, if the user reselects the button 1410 in a state in which the corresponding mode is active, the corresponding mode may be inactivated.

Referring to FIG. 15, a seventh screen 1500 represents an example in which, in response to the user selecting an object on which a video of a participant is displayed, for example, touching an area on which an object is displayed, in a state in which a mode for selecting participants to be included in the whisper group is active, the participant corresponding to the selected object participates in the whisper group. For example, referring to the seventh screen 1500, indications 1510 and 1520 respectively represent that, in response to the user selecting the User 6 and the User 11, the User 6 and the User 11 are selected for the whisper group. Here, a second indication 1530 represents a number of participants selected by the user in the aforementioned mode. For example, the second indication 1530 represents that two participants are included in the whisper group in which four participants are includable by providing an image in two of four circles in the second indication 1530. As shown, the image representing each of the two participants in the whisper group includes an ear. As another example, the second indication 1530 may be determined based on a profile of a participant included in the whisper group. As described above, a number of participants included in the whisper group may be readily set depending on example embodiments, without being particularly limited.

According to another example embodiment, a user that sets a whisper group according to one of FIGS. 12 to 15 may be automatically included in the whisper group without a separate input.

Figure 16:
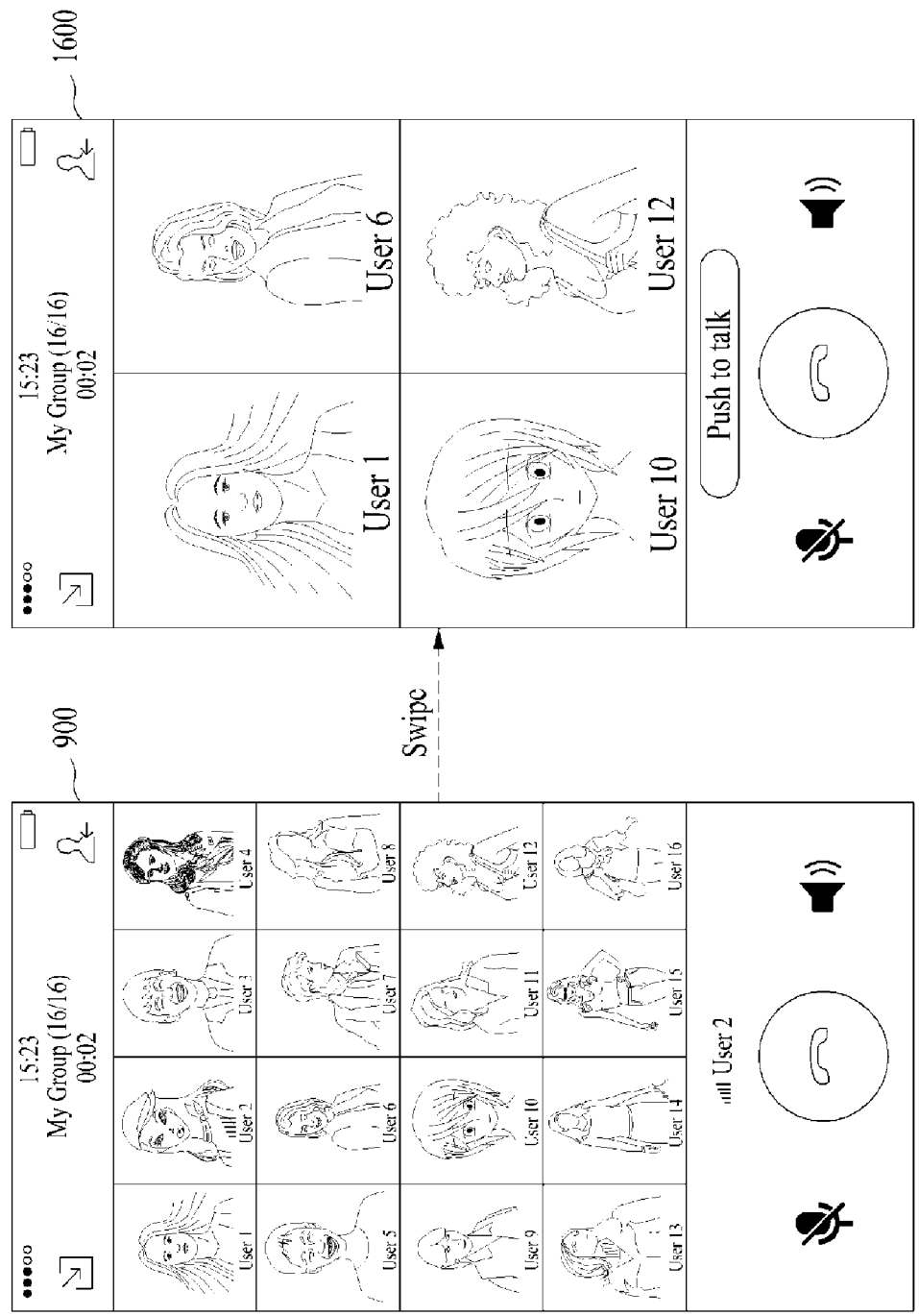
FIG. 16 illustrates an example of activating a whisper group according to at least one example embodiment.

FIG. 16 illustrates an example of activating a whisper group according to at least one example embodiment. FIG. 16 illustrates an example in which the user activates a whisper group as displayed on an eighth screen 1600 through a preset touch gesture (e.g., a swipe in a first direction in the example embodiment) during the progress of the group call as displayed on the first screen 900 of FIG. 9. For example, in response to recognizing a swipe from the right to the left on the first screen 900, the terminal of the user may activate a preset whisper group. Here, the eighth screen 1600 represents an example of a screen for activating a whisper group that includes four participants, for example, User 1, User 6, User 10, and User 12. Upon activation of the whisper group, a whisper packet may be configured such that video and/or audio input through an input device, for example, a camera and/or a microphone, included in the terminal of the user may be transferred only to the participants of the whisper group while the corresponding whisper group is active. In response to recognizing a swipe in a second direction, for example, a swipe from the left to the right, on the eighth screen 1600, the terminal of the user may inactivate the whisper group and may process again a call with all participants of the group call as displayed on the first screen 900.

As another example, a plurality of whisper groups may be set by the user. In detail, a first whisper group including four participants, for example, User 1, User 6, User 10, and User 12, and a second whisper group including three participants, for example, User 3, User 6, and User 9, may be set. Here, in response to recognizing a swipe from the right to the left on the first screen 900, the terminal of the user may activate the first whisper group. In response to recognizing a swipe from the right to the left one more time, the terminal of the user may activate the second whisper group. Further, in response to recognizing a swipe from the left to the right in a state in which the second whisper group is active, the terminal of the user may inactivate the second whisper group and activate the first whisper group. In response to recognizing a swipe from the left to the right in a state in which the first whisper group is active, the terminal of the user may inactivate the first whisper group and may process a call with the entire participants of the group call again as displayed on the first screen 900. The swipe used herein refers to an example of quickly activating a whisper group. Also, it may be easily understood from the foregoing description that the whisper group may become activate and/or inactive through the aforementioned touch gesture.

Figure 17:
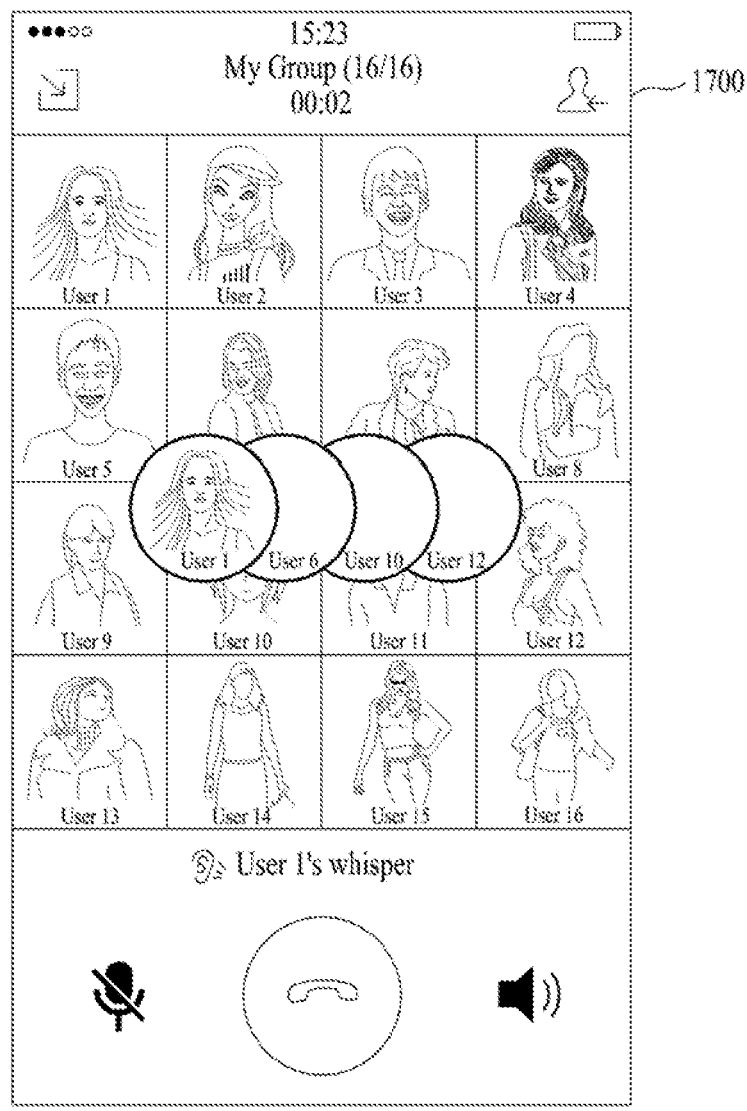
FIG. 17 illustrates an example of a screen in the case of being included in a whisper group and receiving a whisper according to at least one example embodiment.

FIG. 17 illustrates an example of a screen of a terminal that is included in a whisper group and receiving a whisper according to at least one example embodiment. If another participant sets a whisper group by including a user, the whisper group including the user may be automatically generated. Referring to FIG. 17, if the whisper group is active and a whisper packet is received, a terminal of the user may highlight and display objects corresponding to the participants, for example, User 1, User 6, User 10, and User 12, of the whisper group as displayed on a ninth screen 1700. Here, as described above, audio transferred through a whisper packet may be modulated and thereby output. For example, the terminal of the user may modulate the audio included in the whisper packet through howling processing and then output the modulated audio through a speaker. If a single user, for example, the User 1 sets the whisper group, the corresponding whisper group may be automatically set with respect to each of the other participants, for example, User 6, User 10, and User 12, of the whisper group, such that all of the participants of the whisper group may transfer a whisper to the corresponding whisper group.

FIG. 18 is a flowchart illustrating an example of a group call method according to at least one example embodiment. The group call method according to the example embodiment may be performed by the computer apparatus 200 that implements a client participating in a group call session. In this case, the processor 220 of the computer apparatus 200 may be configured to execute a control instruction according to a code of at least one program or a code of an OS included in the memory 210. Here, the processor 220 may control the computer apparatus 200 to perform operations 1810 to 1840 included in the group call method of FIG. 18 in response to the control instruction provided from the code stored in the computer apparatus 200.

Referring to FIG. 18, in operation 1810, the computer apparatus 200 may participate in a group call session. When the computer apparatus 200 participates in the group call session, a group call with other participants of the corresponding group call session may proceed. As described above, during the group call, packets including videos and/or audio may be broadcasted to participants of the group call session.

In operation 1820, the computer apparatus 200 may designate at least one participant among a plurality of participants that participates in the group call session as a whisper target in response to a touch gesture on a touchscreen included in the computer apparatus 200 in a state in which the group call session is maintained. Here, the touchscreen may be included in the I/O apparatus 250 of FIG. 2.

According to an example embodiment, the computer apparatus 200 may display an object corresponding to each of the plurality of participants on the touchscreen and may identify an object indicated by a touch that occurs on the touchscreen and is maintained during a preset period of time. In this case, the computer apparatus 200 may designate a participant corresponding to the identified object as the whisper target while the touch is maintained. If the corresponding touch is released, the corresponding participant may be released from the whisper target. That is, the user may quickly designate the whisper target and may transmit a whisper to the designated whisper target by simply touching an object of a desired participant among objects respectively corresponding to the participants displayed on the touchscreen. The user may also quickly release the whisper target by releasing the touch of the object.

According to another example embodiment, the computer apparatus 200 may set a whisper group including at least one participant among the plurality of participants in a state in which the group call session is maintained, and may activate the whisper group in response to a touch gesture preset for the touchscreen. For example, the computer apparatus 200 may activate the whisper group in response to a swipe gesture in a first direction on the touchscreen. In response to a swipe gesture in a second direction opposite to the first direction while the whisper group is active, the computer apparatus 200 may inactivate the whisper group. Here, the computer apparatus 200 may designate at least one participant included in the whisper group as the whisper target while the whisper group is active. That is, the user may activate and/or inactivate the whisper group through a simple touch gesture and may simply transmit a whisper only to participants of the whisper group among the entire participants.

As an example embodiment for setting the whisper group, the computer apparatus 200 may display objects respectively corresponding to the plurality of participants and a whisper group setting area on the touchscreen. Here, the user may move an object of a participant the user desires to include in the whisper group to the whisper group setting area through a drag-and-drop gesture. In this case, the computer apparatus 200 may easily and quickly set the whisper group by identifying the object that is moved to the whisper group setting area through the drag-and-drop gesture and by including a participant corresponding to the identified object in the whisper group.

As another example embodiment for setting the whisper group, the computer apparatus 200 may display objects respectively corresponding to the plurality of participants and a whisper group generation area on the touchscreen. In this case, the user may select a participant by selecting an object of a participant the user desires to include in the whisper group, for example, by touching an area on which the corresponding object is displayed, in a state in which the whisper group generation button is active. In this case, the computer apparatus 200 may easily and quickly set the whisper group by identifying an object indicated by a touch that occurs on the touchscreen in a state in which the whisper group generation button is activate and by including a participant corresponding to the identified object in the whisper group.

In operation 1830, the computer apparatus 200 may configure a whisper packet to transfer, to the whisper target, at least one of video and audio that are input through an input device included in the computer apparatus 200 while the group call session is designated. Here, a method of configuring the whisper packet is described above in detail with reference to FIGS. 3 to 8. Here, the input device may include, for example, a camera and/or a microphone and may also be included in the I/O apparatus 250 of FIG. 2.

In operation 1840, the computer apparatus 200 may transmit the whisper packet to a server through the group call session. In this case, the server may quickly process the whisper by transferring the whisper packet only to the corresponding participant. Here, a method of transferring, by the server, the whisper packet to the corresponding participant is described above in detail with reference to FIGS. 3 to 8.

In operation 1850, the computer apparatus 200 may receive a whisper packet from the server. For example, if another participant of the group call session designates the user as a whisper target, a whisper packet from a terminal of the other participant may be transmitted to the computer apparatus 200 through the server.

In operation 1860, the computer apparatus 200 may modulate an audio included in the received whisper packet and may output the modulated audio through an output device included in the computer apparatus 200, for example, a speaker included in the computer apparatus 200. Alternatively, the computer apparatus 200, in displaying objects respectively corresponding to the plurality of participants on the touchscreen, may highlight and display an object corresponding to a participant having transmitted the received whisper packet or may highlight and display objects corresponding to participants of a whisper group set by the participant having transmitted the received whisper group. For example, if the other participant designates only the user as the whisper target and transmits a whisper packet, an object corresponding to the other participant that transmits the whisper packet may be highlighted and displayed and an audio of the corresponding participant included in the whisper packet may be modulated and output. As another example, if a participant included in the whisper group transmits a whisper packet, the corresponding whisper packet may be transferred to participants included in the corresponding whisper group. In this case, the computer apparatus 200 may modulate and output audio of all whisper packets transmitted from the participants included in the whisper group. Here, the computer apparatus 200 may highlight objects corresponding to the participants included in the whisper group and may display the same on the touchscreen.

As described above, according to some example embodiments, it is possible to select a desired participant or participant group spontaneously during the progress of a group call with the entire participants of the group call and to allow whispering with the selected participant or participant group.

The systems or the apparatuses described herein may be implemented using hardware components, software components, and/or a combination thereof. For example, a processing device may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, computer record medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable record mediums.

The methods according to the example embodiments may be recorded in non-transitory computer-readable storage media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable storage media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of other media may include recording media and storage media managed by an Appstore that distributes applications or a site, a server, and the like that supplies and distributes other various types of software. Examples of program instructions include both machine code, such as produced by a compiler, and files containing higher level code that may be executed by the computer using an interpreter. The described hardware devices may be to act as one or more software modules in order to perform the operations of the above-described embodiments, or vice versa.

The foregoing embodiments are merely examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A non-transitory computer-readable recording medium storing instructions that, when executed by a processor of a computer apparatus including a touchscreen and an input device, cause the computer apparatus to execute a group call method comprising:
    participating in a group call session with a plurality of participants;
    designating at least one participant among the plurality of participants as a whisper target based on a first touch gesture on the touchscreen during the group call session;
    generating a whisper packet configured to control a server to transfer, only to the whisper target, at least one of video and audio that are input through the input device while the whisper target is designated; and
    transmitting the whisper packet to the server through the group call session,
    wherein the designating comprises:
        setting a whisper group including the at least one participant during the group call session being maintained;
        activating the whisper group based on a second touch gesture on the touchscreen; and designating, during the whisper group being activated, a participant of the whisper group as the whisper target, wherein the setting of the whisper group comprises setting a first whisper group and a second whisper group, wherein the activating of the whisper group comprises deactivating the first whisper group and activating the second whisper group based on a swipe action for switching a first screen displaying the first whisper group, to a second screen displaying the second whisper group, and wherein the designating comprises, while the second whisper group is activated, transmitting the whisper packet to the whisper target while the first touch gesture to an object that is identified from the second whisper group is being maintained, and stopping the transmission of the whisper packet in response to the first touch gesture being released from the object.

2. The non-transitory computer-readable recording medium of claim 1, wherein the designating comprises:
displaying a plurality of objects respectively corresponding to the plurality of participants on the touchscreen;
identifying the object from among the plurality of objects indicated by the first touch gesture to the object on the touchscreen that is maintained for a preset period of time, while the second whisper group is activated.

3. The non-transitory computer-readable recording medium of claim 1, wherein the activating comprises:
activating the first whisper group and deactivating the second whisper group based on another swipe action for switching the second screen to the first screen.

4. The non-transitory computer-readable recording medium of claim 1, wherein the setting of the whisper group comprises:
displaying images of the plurality of participants, together with a whisper group generation button in a whisper group generation area on the touchscreen;
activating a whisper group member selection mode based on selection of the whisper group generation button;
identifying whisper target candidates indicated by a touch on the touchscreen in a state in which the whisper group member selection mode is active;
including the participants from among the plurality of participants that corresponds to the whisper target candidates in the whisper group; and
displaying a number of whisper group participant indications that correspond to a number of the participants in the whisper group.

5. The non-transitory computer-readable recording medium of claim 1, wherein the whisper group is automatically set for each of the at least one participant included in the whisper group through the server based on the whisper group being set.

6. The non-transitory computer-readable recording medium of claim 1, wherein the setting of the whisper group comprises:
displaying a plurality of objects respectively corresponding to the plurality of participants and a whisper group setting area on the touchscreen;
identifying a whisper target candidate from among the plurality of objects that is moved to the whisper group setting area through a drag-and-drop gesture; and
including the participant from among the plurality of participants that corresponds to the whisper target candidate in the whisper group.

7. The non-transitory computer-readable recording medium of claim 1, wherein the group call method further comprises:
receiving the whisper packet from the server;
modulating an audio signal indicated by the received whisper packet such that a voice of the designated participant is audibly emphasized over voices of other participants in the group call session; and
outputting the modulated audio signal through an output device of the computer apparatus.

8. The non-transitory computer-readable recording medium of claim 1, wherein the group call method further comprises:
displaying a plurality of objects respectively corresponding to the plurality of participants on the touchscreen;
receiving the whisper packet from the server; and
displaying the object from among the plurality of objects corresponding to the participant having transmitted the received whisper packet, to be laid over the plurality of objects that are displayed on the touchscreen.

9. A group call method comprising:
participating in a group call session with a plurality of participants;
designating at least one participant among the plurality of participants a whisper target based on a first touch gesture on a touchscreen during the group call session;
generating a whisper packet configured to control a server to transfer, only to the whisper target, at least one of video and audio that are input through an input device while the whisper target is designated; and
transmitting the whisper packet to the server through the group call session, wherein the designating comprises:
setting a whisper group including the at least one participant during the group call session being maintained;
activating the whisper group based on a second touch gesture on the touchscreen; and
designating, during the whisper group being activated, a participant of the whisper group as the whisper target, wherein the setting of the whisper group comprises setting a first whisper group and a second whisper group, wherein the activating of the whisper group comprises deactivating the first whisper group and activating the second whisper group based on a swipe action for switching a first screen displaying the first whisper group, to a second screen displaying the second whisper group, and wherein the designating comprises, while the second whisper group is activated, transmitting the whisper packet to the whisper target while the first touch gesture to an object that is identified from the second whisper group is being maintained, and stopping the transmission of the whisper packet in response to the first touch gesture being released from the object.

10. The group call method of claim 9, wherein the designating comprises:
displaying a plurality of objects respectively corresponding to the plurality of participants on the touchscreen;
identifying the object from among the plurality of objects indicated by the first touch gesture on the touchscreen that is maintained for a preset period of time, while the second whisper group is activated.

11. The group method of claim 9, wherein the activating comprises:

activating the first whisper group and deactivating the second whisper group based on another swipe action for switching the second screen to the first screen.

12. The group call method of claim 11, wherein the setting of the whisper group comprises:
    displaying a plurality of objects respectively corresponding to the plurality of participants and a whisper group generation button in a whisper group generation area on the touchscreen;
    activating a whisper group member selection mode based on selection of the whisper group generation button;
    identifying a whisper target candidate indicated by a touch on the touchscreen in a state in which the whisper group member selection mode is active; and
    including the participant from among the plurality of participants that corresponds to the whisper target candidate in the whisper group.

13. The group call method of claim 11, wherein the whisper group is automatically set for each of the at least one participant included in the whisper group through the server based on the whisper group being set.

14. The group call method of claim 11, wherein the setting of the whisper group comprises:
    displaying a plurality of objects respectively corresponding to the plurality of participants and a whisper group setting area on the touchscreen;
    identifying a whisper target candidate from among the plurality of objects that is moved to the whisper group setting area through a drag-and-drop gesture; and
    including the participant from the plurality of participants that corresponds to the whisper target candidate in the whisper group.

15. The group call method of claim 9, further comprising: receiving the whisper packet from the server;
    modulating an audio signal indicated by the received whisper packet such that a voice of the designated participant is audibly emphasized over voices of other participants in the group call session; and
    outputting the modulated audio signal through an output device.

16. The group call method of claim 9, further comprising:
    displaying a plurality of objects respectively corresponding to the plurality of participants on the touchscreen;
    receiving the whisper packet from the server; and
    highlighting and displaying the object from among the plurality of objects corresponding to the participant having transmitted the received whisper packet.

17. A computer apparatus comprising:
    a touch screen;
    an input device;
    at least one memory configured to store computer-readable instructions; and
    at least one processor configured to execute the computer-readable instructions to:
        participate in a group call session with a plurality of participants,
        designate at least one participant among the plurality of participants as a whisper target based on a first touch gesture on the touchscreen during the group call session,
        generate a whisper packet configured to control a server to transfer, only to the whisper target, at least one of video and audio that are input through the input device while the whisper target is designated, and transmit the whisper packet to the server through the group call session,
    wherein, in designating the at least one participant, the at least one processor is configured to:
        set a whisper group including the at least one participant during the group call session being maintained;
        activate the whisper group based on a second touch gesture on the touchscreen; and
        designate, during the whisper group being activated, a participant of the whisper group as the whisper target,
    wherein, in setting the whisper group comprises, the at least one processor is configured to: set a first whisper group and a second whisper group,
    wherein, in activating the whisper group, the at least one processor is configured to deactivate the first whisper group and activating the second whisper group based on a swipe action for switching a first screen displaying the first whisper group, to a second screen displaying the second whisper group, and
    wherein, in designating the at least one participant, the at least one processor is further configured to, while the second whisper group is activated, transmit the whisper packet to the whisper target while the first touch gesture to an object that is identified from the second whisper group is being maintained, and stopping the transmission of the whisper packet in response to the first touch gesture being released from the object.

18. The computer apparatus of claim 17, wherein the at least one processor is further configured to execute the computer-readable instructions to:
    display a plurality of objects respectively corresponding to the plurality of participants on the touchscreen,
    identify the object from among the plurality of objects indicated by the first touch gesture on the touchscreen that is maintained for a preset period of time while the second whisper group is activated.

19. The computer apparatus of claim 17, wherein the at least one processor is further configured to execute the computer-readable instructions to:
    activate the first whisper group and deactivate the second whisper group based on another swipe action for switching the second screen to the first screen.

20. The computer apparatus of claim 17, further comprising an output device,
    wherein the at least one processor is further configured to execute the computer-readable instructions to:
    display a plurality of objects respectively corresponding to the plurality of participants on the touchscreen,
    receive the whisper packet from the server,
    modulate an audio signal indicated by the received whisper packet such that a voice of the designated participant is audibly emphasized over voices of other participants in the group call session,
    output the modulated audio signal through the output device included in the computer apparatus, and
    highlight the object from among the plurality of objects corresponding to the participant having transmitted the received whisper packet.

* * * * *